(12) United States Patent
Botrie et al.

(10) Patent No.: US 7,713,628 B2
(45) Date of Patent: May 11, 2010

(54) ACTINIC RADIATION CURABLE COATING COMPOSITIONS

(75) Inventors: Alexander Botrie, Toronto (CA); Yuan Deng, Toronto (CA); Daniel Foucher, Toronto (CA); Tuan Nguyen, Brampton (CA)

(73) Assignee: Chemque, Inc., Ontario (CA)

( * ) Notice: Subject to any disclaimer, the term of this patent is extended or adjusted under 35 U.S.C. 154(b) by 981 days.

(21) Appl. No.: 11/139,508

(22) Filed: May 31, 2005

(65) Prior Publication Data

US 2006/0269756 A1   Nov. 30, 2006

(51) Int. Cl.
  *B32B 27/38* (2006.01)
  *B32B 27/40* (2006.01)
(52) U.S. Cl. ............ 428/411.1; 428/413; 428/423.1; 428/500
(58) Field of Classification Search ............ 428/411.1, 428/413, 423.1, 500; 528/44
  See application file for complete search history.

(56) References Cited

U.S. PATENT DOCUMENTS

| | | | |
|---|---|---|---|
| 4,098,840 A | 7/1978 | Yoshida et al. | |
| 4,100,010 A | 7/1978 | Waugh | |
| 4,528,311 A | 7/1985 | Beard et al. | |
| RE33,175 E | 3/1990 | Waugh | |
| 5,011,605 A | 4/1991 | Pape et al. | |
| 5,013,631 A * | 5/1991 | Su | 430/271.1 |
| 5,086,086 A | 2/1992 | Brown-Wensley et al. | |
| 5,260,350 A | 11/1993 | Wright | |
| 5,516,812 A | 5/1996 | Chu et al. | |
| 5,719,205 A | 2/1998 | Yoshihara | |
| 5,780,117 A | 7/1998 | Swartz et al. | |
| 5,824,761 A | 10/1998 | Bujanowski et al. | |
| 5,827,923 A | 10/1998 | Medford et al. | |
| 6,387,519 B1 | 5/2002 | Anderson et al. | |
| 6,610,777 B1 | 8/2003 | Anderson et al. | |
| 6,623,791 B2 | 9/2003 | Sadvary et al. | |
| 6,635,341 B1 | 10/2003 | Barancyk et al. | |
| 6,673,850 B1 * | 1/2004 | Yamato et al. | 522/33 |
| 6,730,733 B2 | 5/2004 | Overbeek et al. | |
| 6,736,950 B1 | 5/2004 | Klein et al. | |
| 6,780,897 B1 | 8/2004 | Blum et al. | |
| 6,825,241 B1 | 11/2004 | Blum et al. | |
| 6,827,985 B2 | 12/2004 | Levandoski et al. | |
| 6,852,771 B2 | 2/2005 | Balch et al. | |
| 6,855,785 B2 | 2/2005 | Baumgart et al. | |
| 6,864,340 B2 | 3/2005 | Levandoski et al. | |
| 6,906,113 B2 * | 6/2005 | Baudin et al. | 522/37 |
| 2003/0129323 A1 | 7/2003 | Dornieden et al. | |
| 2003/0180541 A1 | 9/2003 | Naik et al. | |
| 2004/0068025 A1 | 4/2004 | Baumgart et al. | |
| 2004/0115363 A1 | 6/2004 | Desai et al. | |
| 2004/0132843 A1 | 7/2004 | Baumgart et al. | |

FOREIGN PATENT DOCUMENTS

| | | |
|---|---|---|
| EP | 0646 632 | 4/1995 |
| EP | 0549 228 | 8/1996 |
| WO | WO 98/53008 | 11/1998 |
| WO | WO 0105846 | 1/2001 |

OTHER PUBLICATIONS

EP 06 25 2569, Partial European Search Report, dated Aug. 25, 2006.
EP 08 17 1067, European Search Report, dated Jan. 19, 2009.

* cited by examiner

*Primary Examiner*—Thao T. Tran
(74) *Attorney, Agent, or Firm*—Banner & Witcoff, Ltd.

(57) ABSTRACT

A cured coating or molded article prepared from a composition comprising an actinic-radiation curing polymer, wherein the composition is cured with actinic radiation at a temperature of at most 150° C. to form the cured coating or molded article; wherein the cured coating or molded article has a thickness of at least about 0.5 mm and a hardness of about Shore A 90 to about Shore D 90.

23 Claims, No Drawings

ACTINIC RADIATION CURABLE COATING COMPOSITIONS

FIELD OF THE INVENTION

The present invention relates to transparent, high build, coatings and molded articles using actinic-radiation-curable coating materials.

BACKGROUND OF THE INVENTION

The casting of a two-component, clear polyurethane resin upon a substrate to produce a decorative emblem is well known in the art. Cast polyurethane, when cured, gives a lens effect to the surface applied as described in U.S. Pat. Nos. 4,100,010 and RE 33,175. These cast polyurethane resins are commonly referred to as "doming" or "lensing" resins. Doming or lensing resins are typically clear, colorless, high gloss, room temperature or elevated temperature curing, thermosetting systems developed to provide aesthetic enhancement and environmental protection to objects such as, but not limited to, paper, plastic, wood, metal, labels, decals, plaques, badges, name plates, lapel pins, automotive ornamentation, and automotive dashboards to form a durable three-dimensional coating or dome.

In order for a liquid doming resin to achieve the required appearance on an object once it is cured, it preferably has a number of characteristics intrinsic to both the liquid components and the cured resin. First, the formulation should be a clear, colorless, low viscosity liquid. It should flow sufficiently to cover the entire surface to which it is applied. It should produce a coating from approximately 20 mils (0.5 mm) to 100 mils (2.5 mm) high. It should fully cure within forty-eight hours at 25° C. & 50% R.H. The curing of the coating resin formulation should not cause shrinkage, wrinkles, surface defects, curling, or other deviations from a clear, transparent, smooth, high gloss surface. It should not contain volatile solvents (less than 1%). Once cured, the coating should maintain its initial hardness and flexibility after heat and environmental aging.

Doming resins typically have an application viscosity of about 100 to 5000 cps, are generally clear and colorless, and cure to a smooth, defect free, flexible or rigid coating. In addition to protecting the substrate surface from the environment, the resins are usually transparent providing an aesthetically appealing lensing effect to the pattern, design, or scripting on or near the substrate surface over which the resins are placed.

Currently, conventional doming resins are practically applied as two-component, 100% solids, polyurethane systems, which may be room temperature cured or cured with heat. Two-component epoxy systems are sometimes used in indoor applications. However, they cannot be used outdoors or in applications where they will be exposed to a high concentration of UV light, as they will yellow. Polyurethane systems, based primarily on aliphatic diisocyanates, are used for most indoor and outdoor applications.

There are major disadvantages with these two-component conventional systems. They need specialized two-component metering-mixing and dispensing systems to accurately dispense and mix the two reactive components. The curing of these resins must be made sufficiently slow so that the resin does not cure in the mixing unit. However, the resins then cure slowly once dispensed onto the desired substrate. Smaller parts cure slower than larger parts. Tack-free times are usually greater than six hours at ambient temperatures with full cure taking up to five days. Vacuum tables are often used to keep the substrate flat until the resin thickens sufficiently so that it will not flow off of the part. This can take hours at ambient temperatures.

Special safety precautions are also necessary due to the inherent toxicity of isocyanate and epoxy resin components in these formulations. Additionally, in isocyanate-functional systems, outgassing can occur when the isocyanate component undesirably reacts with a source of water or carboxyl groups and not the hydroxyl groups present in the first component. This will cause carbon dioxide bubbles to generated & become entrapped in the cured product, essentially ruining the appearance and protective properties of the coating.

Compounds based on the heavy metals; especially mercury and lead, are commonly used as catalysts in these polyurethane based systems. These compounds present both safety and environmental concerns. Phenyl mercuric acetate is one example of such a catalyst.

Furthermore, polyurethane-based systems cannot be made softer than about 70 Shore A. Thus, they cannot be used on pressure sensitive adhesive labels for applications requiring a very soft, flexible dome, such as on highly curved surfaces, unless very strong adhesives are used.

These two-component polyurethane and epoxy systems are also used in molding applications to produce molded designs, nameplates, and lettering and in scripting and design applications. Here again these systems are limited by their long curing times and usually must be left to cure at least twenty-four hours before they can be packaged.

Heat curing systems to accelerate the curing process are available. However they are expensive and require at least twenty minutes at 60° C. for the epoxies and polyurethanes to reach a tack free state. After that, they again must sit for at least twenty-four hours before the molded parts and letters can be packaged.

One-component, thin coatings that cure by actinic radiation are extensively used for thin coatings. These coatings are usually applied at less than 5 mils thick (0.13 mm). High build (>10 mils) UV curable coatings are severely limited because of high shrinkage during the curing process. Because of this high shrinkage these coatings have poor flexibility and poor adhesion to many substrates. This high shrinkage also limits the use of these UV curing doming resins to very small parts, usually less than 3 cm diameter. If placed on larger parts, such as flexible labels or decals, the shrinking would cause the part to curl on curing. Furthermore, these systems yellow on exposure to UV light and cannot be used in outdoor applications. Furthermore, acrylic monomers are very expensive and these systems contain high acrylic monomer contents. There are also health concerns over the toxicity and sensitizing properties of the acrylate based functional monomers.

Co-pending application Ser. No. 11/124,077 describes one-component silylated, high build coatings that can also be used in doming resin applications. These silylated systems have many advantages over two-component systems. They do not require two-component, meter-mix-dispensing systems, they do not produce carbon dioxide bubbles on exposure to moisture and they do not contain heave metals. Although the application is useful for many applications, the tack-free times are in the area of thirty minutes to two hours.

Dual cure compositions have been used for structural adhesives such as described in EP 646632A1, WO 0105846 and WO 98/53008. A photocurable resin composition for use in coatings comprising a component with dual functionality, acrylate and silane, is described in EP 0549228B1.

There is a need for a curing system that can be used in doming, scripting, and molding applications that cures quickly or instantly, does not shrink, has good UV light and weathering resistance, and can be packaged as soon as it has been cured.

SUMMARY OF THE INVENTION

The present invention relates to transparent, high build, coatings prepared from actinic radiation curable polymers, optionally with additional alternative curable polymers. In one particular embodiment, the present invention is directed to a low- or non-toxic instant-curing doming resin composition comprising at least an actinic-radiation curing polymer.

The composition has low viscosity, and is easy to dispense, process, and cure. The composition has high build and, once cured, is flexible. The composition contains a very low or no monomer content depending on acceptable exotherm levels/values. Shrinkage during cure is much lower than standard actinic-radiation curing formulations and is comparable to two-component polyurethane formulations. Properties in the liquid and cured states are also comparable to two-component polyurethane coating systems. It has excellent adhesion to many substrates and can be formulated to have excellent outdoor weathering properties. It does not have the inherent drawbacks of current actinic-radiation curing systems.

One embodiment of the present invention is directed to an article comprising a substrate and a cured coating; wherein the coating is prepared from a composition comprising an actinic-radiation curing polymer, wherein the composition is cured with actinic radiation at a temperature of at most 150° C. to form the cured coating; wherein the cured coating has a thickness of at least about 0.5 mm and a hardness of about Shore A 90 to about Shore D 90.

Another embodiment of the present invention is directed to a molded article prepared from a composition comprising an actinic-radiation curing polymer, wherein the composition is cured with actinic radiation at a temperature of at most 150° C. to form the cured molded article; wherein the molded article has a thickness of at least about 0.5 mm and a hardness of about Shore A 90 to about Shore D 90.

The actinic-radiation curing polymer may be an acrylate polymer or a mixture of acrylate polymers, such as selected from the group consisting of epoxy acrylates, urethane acrylates, polyester acrylates, polyether acrylates, amine-modified polyether acrylates, acrylic acrylates, and mixtures thereof. Preferably the acrylate polymer is a urethane acrylate.

The actinic-radiation curing polymer may also be a UV cationic curing polymer such as those selected from the group consisting of cycloaliphatic epoxy resins, caprolactone polyols, diglycidal ether of bisphenol A, monoepoxides and vinyl ethers.

The composition has a viscosity of 50 to 20,000 cps, preferably from about 100 to about 10,000 cps, more preferably about 300 to about 5000 cps.

In a further embodiment, the composition further comprises a two-component epoxy or polyurethane polymer such as an aliphatic isocyanate polyurethane.

In another further embodiment the composition further comprises a moisture-curable silylated resin composition.

The composition typically further comprises at least one photoinitiator and may contain at least one of the following flow agents, viscosity modifiers, foam control agents, plasticizing agents, moisture scavengers, adhesion promoters, temperature stabilizers, ultraviolet radiation stabilizers, or colorizing additives.

The present invention is further directed to a method of preparing an article comprising a substrate and a cured coating; comprising preparing a composition comprising an actinic-radiation curing polymer, applying the composition to the substrate to form coating having a thickness of at least about 0.5 mm and curing the composition with actinic radiation while maintaining a temperature of at most 150° C. to form the cured coating; wherein the cured coating has a hardness of about Shore A 90 to about Shore D 90. Preferably the coating is cooled during curing.

The present invention is further directed to a method of preparing molded articles comprising preparing a composition comprising an actinic-radiation curing polymer, pouring the composition into a mold having a thickness of at least about 0.5 mm and curing the composition with actinic radiation while maintaining a temperature of at most 150° C. to form the molded article; wherein the cured molded article has a hardness of about Shore A 90 to about Shore D 90. Preferably the coating is cured.

The present invention is further directed to a method of decreasing tack free cure-time of a two-part polyurethane or epoxy composition comprising adding to the composition a sufficient amount of an actinic-radiation curing polymer to reduce the tack-free time, and then applying actinic radiation to the composition while maintaining a temperature of at most 150° C. Preferably application of the actinic radiation forms a skin on the outside of the coating.

The present invention is further directed to a method of decreasing tack free cure-time of a moisture curable silylated composition comprising adding to the composition a sufficient amount of an actinic-radiation curing acrylate polymer or acrylate monomer to reduce the tack-free time, and then applying actinic radiation to the composition. Preferably, application of the actinic radiation forms a skin on the outside of the coating.

These dual-curing systems are also capable of shadow cure.

DETAILED DESCRIPTION OF THE INVENTION

Actinic-radiation curing has been used to provide resin systems that cure at high speed at room temperature upon exposure to the appropriate energy, thus improving productivity. Actinic radiation is electromagnetic radiation such as near infrared, visible light, UV light, or X-rays, in particular UV light, or corpuscular radiation such as an electron beam. Ultraviolet radiation and electron beam curing also reduces volatile organic compound emissions.

Success has been achieved and technical information is readily available on thin (<5 mils) radiation curable coatings. However, high build coatings differ from low build coatings and little information is available for high-build coatings and doming resins (>20 mils thick).

In high build coatings, radiation must penetrate through much thicker sections than low build coatings. Because of the greater mass in high build coatings, a much higher exotherm is realized during cure and heat dissipation is much slower. Shrinkage from high exotherm temperatures is also more pronounced in high build coatings. The present invention is based on discovery of a polymer system and process conditions that overcome these difficulties of prior art high build coatings.

The present invention is directed to doming (high build) compositions containing at least one actinic-radiation curable polymer, and optionally, additional alternative cure polymers. A single curing system is obtained using the actinic-radiation curable polymer without the addition of alternative curing polymers. A dual-curing system is obtained when the polymer is combined with a second polymer such as a two-component polyurethane or epoxy or a moisture-curing silylated polymer.

The actinic-radiation curing composition has a viscosity from about 50 to about 20,000 cps, preferably from about 100 to about 10,000 cps, more preferably about 300 to about 5000 cps. This range provides a balance among such factors as ease of pouring, ability to generate a dome of approximately 0.5 to 2 mm high, and the ability to flow to the edge of the part and stop. Much higher domes are possible if they are molded.

During application of the actinic radiation, the temperature of the coating should be less than 150° C., preferably less than 100° C., and more preferably less than 70° C. This minimizes linear shrinkage, curling of flexible articles, and improves adhesion to flexible and rigid articles. Preferably, linear shrinkage is kept below 2% and preferably below 1%. The temperature may be maintained by any suitable cooling means.

The actinic-radiation curable may be an acrylate polymer or mixture of acrylate polymers. Acrylate polymer may be selected from epoxy acrylates, urethane acrylates, polyester acrylates, polyether acrylates, amine modified polyether acrylates or acrylic acrylates. One skilled in the art is familiar with the manufacture of these polymers.

A preferred acrylate polymer is a urethane acrylate. Aliphatic urethane acrylates possess the excellent weathering properties required for outdoor applications. The urethane acrylate provides flexibility, toughness, hardness, and weathering properties to the actinic-radiation curable coating.

Acrylate monomers used to prepare the acrylate polymers can be monofunctional, difunctional or trifunctional. Because addition of acrylate monomers to the UV-curing polymer will increase the shrinkage of the composition, acrylic monomers are generally kept to a minimum. For instance, the amount of monomers depends on acceptable exotherm. Shrinkage is typically more pronounced in thicker films and coatings than in thinner films and coatings. It was discovered that replacing the acrylic monomers with approximately equal quantities of vinyl ethers reduced the exotherm, reduced the shrinkage, and caused a greater viscosity reduction.

In general, polyurethane acrylates, polyester acrylates, epoxy acrylates, and acrylic acrylates with higher functionality will shrink more than those with lower functionality. Therefore, monofunctional and difunctional acrylates are preferred over acrylate polymers with higher functionality, although polymers with higher functionality can also be used.

Heat is generated when the actinic-radiation curing resin is exposed to high intensity light. Higher temperatures are reached and the heat is retained longer in thick coatings than in thin coatings. For example, a 0.08" thick UV-curing polymer reached a temperature of 240° C. on exposure to high intensity UV radiation for one second. The same resin at 0.001" thick only reached a temperature, of 50° C. This high exotherm causes high shrinkage of the coating. Shrinkage is not desired as flexible articles will tend to curl and adhesion will be difficult in both flexible and rigid articles.

Generally, polymers with higher crosslinking density tend to shrink more on curing than polymers with lower crosslinking density. In addition, a polymer that generates more heat on curing and has a higher exotherm tends to shrink more than a similar polymer with a lower exotherm. Higher functional polymers of the same polymeric backbone will tend to have a higher exotherm. Controlling the exotherm will help reduce the shrinkage.

Furthermore, since exposure to UV light is only for fractions of a second, highly focused lamps with maximum intensity are required. Most of these lamps also emit IR radiation which also contributes to heating the coating during the UV-curing process.

Besides formulating the UV-curable coating to have a low exotherm, it is also possible to obtain the desired results of lower shrinkage by cooling the resin or the substrate to reduce the maximum temperature that the resin reaches during cure. This can be obtained by cooling the substrate, the resin, or both. This cooling is effective when applied before, during, and immediately after exposure to the UV light, and may be achieved by any suitable method or apparatus.

Another method of decreasing the shrinkage in thick coatings is to use a lower light intensity over a longer period of time. However, this may increase the time it will take for the part to cure, slowing production, and increasing costs.

Generally, the composition when applied to a substrate at a thickness of 2 mm at a temperature of 25° C. and a relative humidity of 50% typically cures in one pass at a conveyor speed of 20 ft/minute.

The composition, when cured, will typically have a hardness of between 10 Shore A and about 90 Shore D. The hardness can be controlled with different polyols, isocyanates, acrylates and monomers, and different combinations thereof. Those skilled in the art are familiar how to formulate the UV-curing composition to obtain the desired hardness and other properties.

It was further discovered that combining the actinic-radiation curing polymer and a second type of polymer provides doming resins and high build coatings having good tack-free times but low shrinkage. Such polymers are polyurethanes, epoxies, and silylated polymers. These combinations provide single compositions having a dual-cure characteristic.

The actinic radiation curable polymer can be present in quantities as high as 95 wt % of the formulation and as low as 5 wt % in these systems. Typically the range will fall between about 10 wt % to about 50 wt %.

Suitable actinic-radiation curing polymers include both acrylate polymers and UV cationic curing polymers. In acrylate polymers, aliphatic urethane based acrylates were found to be very suitable because of their good weathering properties. However, polyester acrylates, polyether acrylates, aliphatic epoxy acrylates and acrylic acrylates can also be used. In cationic cure polymers, cycloaliphatic epoxy resins are used.

In the dual-cure systems, the compatibility between the polymers, acrylates or other unsaturated moieties can be improved by reacting the acrylate or other suitable monomer, onto the same molecule as the isocyanate or polyol of the two-component polyurethane or onto the same molecule as the silane.

In one dual-cure system, a composition is prepared from an actinic-radiation curing polymer and a two-component polyurethane or a two-component epoxy. This dual-cure system utilizes both energy radiation and the reaction of the two-component resin to cure the composition.

Two-component polyurethane and epoxy coatings are very slow to cure. They become tack-free in 6 hours or more and fully cure in twenty-four hours of longer. Therefore, they have very low exotherms. Measured exotherms are less than 5° C. for coatings cured at ambient temperatures.

On the other hand, UV-curing resins, for example, react very quickly and have very high exotherms. Increasing the concentration of UV curable resins results in higher exotherms and higher shrinkage. With larger concentrations of the polyurethane, the wet and cured properties resemble the properties of the two-component polyurethane. The relative quantities of the two polymers can be changed to achieve the desired liquid and cured properties. The two-component polyurethane provides low liquid viscosity, low exotherm, low shrinkage, shadow cure and adhesion. The UV-curing polymer provides instant curing and tack-free time. Formulations for two-component polyurethane doming resins and high build coatings are described in U.S. Pat. Nos. 4,100,010 & RE. 33,175, for example.

It was discovered that the combination of actinic-radiation curable polymer and two-component polyurethane and epoxy polymers instantly forms a "skin" on the surface of the coating upon irradiation with actinic-radiation. The combination cures sufficiently through the body of the resin so that the coated article can be moved easily without the coating flowing over the edge of the substrate. This skin also prevents dust from being cured onto the surface of the coating. Shrinkage is very low and comparable to two-component polyurethane doming resin formulations.

In another dual-cure system, a composition is prepared from an actinic-radiation curing polymer and a one-component moisture-curing silylated polymer. In this dual-cure system, both actinic-radiation and moisture are used in combination to cure the composition.

Formulations for the silylated polymers are described in co-pending application Ser. No. 11/124,077, incorporated herein by reference in its entirety.

The silylated polymer provides low shrinkage properties as well as flexibility, elongation, shadow cure and adhesion to the finished product. The UV curable composition provides the instant cure and hardness. The relative quantities of the UV-curing polymer and the silylated polymer can be changed to provide the desired liquid and cured properties.

It was further discovered that the combination of an actinic-radiation curable composition and a one-component, moisture curing silylated polymer would provide instant skinning of these compositions on irradiation. This allows the domed article to be lightly handled immediately after exposure to the actinic-radiation. It also prevents dust and dirt from curing on the domed article.

It was further discovered that building certain properties into the actinic-radiation curing polymer would enhance desirable properties in the silylated composition that are not easily attainable by the silylated polymer alone. Such properties include flexibility, toughness, and hardness. Moreover shrinkage is much lower than UV curing formulations. Shrinkage is comparable to the shrinkage obtainable with silylated systems alone. Example 14 shows how the hardness of a silylated polymer can be greatly increased with the addition of 10% of an actinic-radiation curable polymer.

The compositions may further comprise one or more photoinitiators. For acrylate polymers, preferred photoinitiators are capable of initiating free radical polymerization, crosslinking, or both, of the ethylenically unsaturated moiety on exposure to radiation of a suitable wavelength and intensity. Cationic photoinitiators are used in UV cure cationic systems where the main part of the formulation is a cycloaliphatic-diepoxide. The photoinitiator can be used alone or in combination with a suitable donor compound or a suitable coinitiator. The photoinitiator and the amount used are selected to achieve a uniform reaction conversion, as a function of the thickness of the coating being cured. The photoinitiator will also determine the degree of total conversion so as to achieve the desired initial handling strength.

The photoinitiator is preferably present in an amount sufficient to provide the desired rate of photopolymerization. The amount will depend, in part, on the light source, the thickness of the layer to be exposed to the radiant energy and the extinction coefficient of the photoinitiator at the wavelength. Typically, the photoinitiator component will be present in an amount of from about 0.01% by weight to about 10% by weight, more preferably from about 0.01% by weight to about 5% by weight. Preferred photoinitiators, for free radical polymerization, include acylphosphine oxides, which are preferably present in an amount from about 0.03% percent by weight to about 0.4% by weight.

Useful photoinitiators for free radical polymerization include, e.g., "alpha cleavage type" photoinitiators, including, e.g., benzyl dimethyl ketal, benzoin ethers, hydroxyl alkyl phenyl ketones, benzoyl cyclohexanol, dialkoxy acetophenones, 1-hydroxycyclohexyl phenyl ketone, trimethylbenzoyl phosphine oxides, methyl thio phenyl morpholino ketones and morpholino phenyl amino ketones; hydrogen abstracting photoinitiators, which include a photoinitiator and a coinitiator, based on benzophenones, thioxanthones, benzyls, camphorquinones, and ketocoumarins; and combinations thereof. Preferred photoinitiators include acetylphosphine oxides, including, e.g., bis(2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide.

Useful commercially available free radical photoinitiators are available as follows: IRGACURE 369, alpha-amino ketone; IRGACURE 819, bis(2,4,6-trimethylbenzoyl)-phenylphosphine oxide; IRGACURE 403, bis-(2,6-dimethoxybenzoyl)-(2,4,4-trimethylpentyl)phosphine oxide; IRGACURE 651, benzyldimethyl-ketal; IRGACURE 184, 1-hydroxy-cyclohexylphenyl-ketone; DAROCUR 1173, 2-hydroxy-2-methyl-1-phenyl-1-propanone; DAROCUR 4265, 50:50 blend of 2-hydroxy-2-methyl-1-phenylpropan-1-one and 2,4,6-trimethylbenzoyldiphenylphosphine oxide, and IRGACURE 1700, 25:75 blend of bis(2,6-dimethoxybenzoyl)-2,4,4-trimethyl phenylphosphine oxide and 2-hydroxy-2-methyl-1-phenyl-propan-1-one. All these products are available from Ciba Geigy.

Common materials used in cationic UV curing systems are cycloaliphatic epoxy resins, caprolactone polyols, diglycidal ether of bisphenol A, monoepoxides and vinyl ethers. Common photoinitiators are mixed triaryl sulfonium hexafluoroantimonate salts, mixed triaryl sulfonium hexafluorophosphate salts and diaryl iodonium hexafluoroantimonate salts. These materials are available from Dow Chemicals.

The composition may also include an effective amount of colorizing additives to provide color effect to the cured formulation. Suitable colorizing additives include, but are not limited to, inorganic pigments such as those based on titanium dioxide, iron oxides, lead oxide, calcium carbonate, cobalt alumina hydrate, barium sulfate, zinc oxide, strontium, chrome, copper, or cobalt; or organic colorants such as the phthalocyanines, azos, perylenes, quinacridones, indanthrones, and pyrroles.

Other additives such as flow agents, viscosity modifiers, foam control agents, plasticizing agents, moisture scavengers, adhesion promoters, temperature stabilizers, and/or ultraviolet radiation stabilizers may be added. Flow agents typically include polyether modified organosilicones, such as Silwet® L-7602 or CoatOSil® 3500 surfactant (GE-OSi); DC-57 Additive (Dow Corning); or Tego® Wet 260 additive (Degussa) Viscosity increasing agents may include surface treated silica, while viscosity reducing agents may include plasticizers such as dioctyl phthalate, diisononyl phthalate, and diisodecyl phthalate. Moisture scavengers such as molecular sieves, oxazolidines and/or vinyl trimethoxysilane are often employed. Adhesion promoters may include organosilanes such as aminopropyltrimethoxysilane, aminopropyltriethoxysilane, aminoethyl-aminopropyltrimethoxysilane, N-phenyl aminopropyltrimethoxysilane, glycidoxypropyltrimethoxysilane, (epoxycyclohexyl)ethyltrimethoxysilane; phosphate, titanate or chromium esters, and zinc compounds. Examples of temperature stabilizers include the Irganox® brands from Ciba specialty chemicals. For example, Irganox 1010 Antioxidant. Light stabilizers of the hydroxyphenyl-s-triazine family were found to be most suitable for use in the high build, clear and pigmented doming resins; for example Tinuvin 400 from Ciba Specialty Chemicals. However, other classes of UV absorbers can also be used, including the hydroxyphenyl-benzotriazoles, hydroxyl-benzophenones and oxalic anilides.

The composition may be applied to any suitable substrate where a high build, clear or pigmented, bubble free, one-component coating is desired; such as decals, logos, badges, sealing, potting and encapsulating electronic and other components, photo-patterning applications and other articles. The substrates can be either flexible or rigid. Scripting and letter writing is also possible. Substrates containing the domed resin may be used for decorative items, promotional items, decals, labels, nameplates, signs, high-build printed and decorative lettering and designs, automotive decorations such as racing stripes and body designs and the like. Because these coatings have excellent weathering properties, items coated with them are protected and may be used in exterior applications. These coatings can be used as a protective and decorative coating. They can also be used to produce decorative lettering, scripting, specialized inks such as inkjet inks and other decorations directly on a substrate or they can be applied to a substrate with a pressure sensitive or other types of adhesives. They can also be used to produce molded items. In this application they will be poured into an open or closed mold and cured. These coatings can also be used for protection against mechanical shock, vibration, and tampering in applications such as potting compounds and conformational coatings. They can also be specially formulated to provide electrical insulation or electrical conductivity. Other potential areas of application include plastic eyeglass lens, automotive and recreational vehicle headlight and tail light lens, cosmetic packaging and many other parts.

Equipment Used

The UV-curing unit was model number LC-6 from Fusion UV Systems fitted with a D-bulb and placed over a conveyor belt running at a speed of approximately 20'/minute. The UV dose delivered at that speed is approximately 1000 mj/cm2 as measured by means of the "CONTROL-CURE® Compact Radiometer from UV Process Supply, Inc.

Shrinkage

Shrinkage of the coating was controlled in two ways.

First, linear shrinkage was kept below 2% and preferably below 1%. Linear shrinkage was determined by pouring the radiation curable polymer with photoinitiator into a mold 12" long by 0.5" wide by 0.125" deep. The mold was passed under a high intensity UV lamp at a conveyor speed of 20"/minute. The length of the cured resin was measured and linear shrinkage determined. See Table 1 at end of examples.

The percentage of linear shrinkage can be obtained with following equation.

$$\text{Shrinkage}(\%) = \frac{L_u - L_c}{L_u} \times 100$$

where, $L_u$—length of uncured sample,
$L_c$—length of cured sample.

Second, controlling the highest temperature the formulated coating reaches while curing on the part also minimizes curling of flexible articles and improves adhesion to flexible and rigid articles. The surface temperature of the coating was measured with an infrared thermometer. This temperature should be less than 150° C., preferably less than 100° C. and most preferably less than 70° C.

Some of the methods used to control the exotherm generated by the coating are as follows:

Use oligomers that are less reactive, generally monofunctional and difunctional oligomers are preferred over oligomers of higher functionalities.

Use low monomer concentration. The reaction of monomers increases the exotherm temperatures.

Use less reactive monomers. Monofunctional monomers are less reactive than difunctional. Difunctional monomers are less reactive than trifunctional.

Use acrylates with electron donor groups next to the unsaturated group.

Acrylic unsaturation is preferred as it cures faster. However, allylic or vinylic unsaturation may also be used as they will contribute to a lower exotherm.

Plasticizers can also be used to decrease the exotherm temperatures by reducing the concentration of reactive materials.

Acrylate Monomers

It was also found that reactive acrylate monomers with the appropriate photoinitiators can be used alone without acrylated oligomers to skin the one-component silylated and the two-component polyurethane and epoxy doming resins. See Example 13

Monofunctional, difunctional, trifunctional, tetrafunctional and monomers of higher functionality can be used. However, generally better results were obtained with di and trifunctional, tetrafunctional and higher functionality monomers.

Cationic UV Curing Resins

Cationically cured photopolymers are similar to the free radically cured photopolymers. They both show shrinkage and cause flexible decals to curl if they exotherm above 70° C. during cure. The higher the exotherm the more they will shrink, the more the flexible decal will curl.

Cationic UV curing resins are also primarily applied as thin films (<6 microns). They are known to have good adhesion and low shrinkage. Samples were prepared and results were compared to acrylated polymers. See Example 9.

Common materials used in cationic UV curing systems are cycloaliphatic epoxy resins, caprolactone polyols, diglycidal ether of bisphenol A, monoepoxides and vinyl ethers. Common photoinitiators are mixed triaryl sulfonium hexafluoroantimonate salts, mixed triaryl sulfonium hexafluorophosphate salts and diaryl iodonium hexafluoroantimonate salts.

EXAMPLES

Example 1

100% Urethane Acrylate

A urethane acrylate was prepared with IPDI, 4-hydroxybutyl acrylate, and a 4000 MW polyether diol in an equivalent ratio of 3/2/1. The reaction product was a clear, colorless liquid. At 25° C. the viscosity was 11,000 cps.

The polymer was mixed with 1.8% Irgacure 184 photoinitiator and cured under a high intensity UV lamp at a conveyor speed of 20'/minute. Linear Shrinkage was 0.93% and Hardness was 84 D0.

Example 2

A doming resin formulation with good outdoor weathering properties was prepared as follows:

| | |
|---|---|
| Polymer from Example 1 | 100.0 |
| Irgacure 184 | 1.8 |
| Irgacure 819 | 0.1 |
| Tinuvin 1130 | 0.5 |
| Tinuvin 292 | 0.5 |
| Irganox 1010 | 0.5 |
| Polyethelene Glycol Diacrylate | 10.0 |

This was a clear, transparent liquid with a viscosity of 7,000 cps.

The coating was poured onto a round, flexible decal of 2" diameter. The coating was applied at a thickness of 0.08". The decal was passed under a high intensity UV lamp at a conveyor speed of 20'/minute. The surface temperature of the coating was 90° C.

Adhesion was good. The cured coating had a 60° gloss of 84 and was transparent.

Some curling of the flexible decal was observed.

Example 3

100% Urethane Acrylate

A urethane acrylate was prepared with IPDI, hydroxypropyl acrylate and a 1000 MW polyether diol in an equivalent ratio of 3/2/1. The reaction product was a clear, colorless liquid. At 25° C. the viscosity was 8,000 cps.

The polymer was mixed with 1.8% Irgacure 184 photoinitiator and cured under a high intensity UV lamp at a conveyor speed of 20'/minute. Linear Shrinkage was 1.55% and Hardness was 40 D0.

Example 4

A doming resin formulation with good outdoor weathering properties was prepared as follows:

| | |
|---|---|
| Polymer in Example 2 | 100.0 |
| Irgacure 184 | 1.8 |
| Irgacure 819 | 0.1 |
| Tinuvin 1130 | 0.5 |
| Tinuvin 292 | 0.5 |
| Irganox 1010 | 0.5 |
| Tetrahydrofurfuryl Acrylate | 10.0 |

This was a clear, transparent liquid with a viscosity of 4,000 cps.

The coating was poured onto a round, flexible decal of 2" diameter. The coating was applied at a thickness of 0.08". The decal was passed under a high intensity UV lamp at a conveyor speed of 20'/minute. The surface temperature of the coating was 115° C. Adhesion was poor. The cured coating had a 60° gloss of 85 and was transparent. There was substantial curling of the decal.

Example 5

100% Urethane Acrylate

A urethane acrylate was prepared with IPDI, hydroxyethyl acrylate and a 1000 MW polyether diol in an equivalent ratio of 6/5/1. The reaction product was a clear, colorless liquid. At 25° C. the viscosity was 166,000 cps.

The polymer was mixed with 1.8% Irgacure 184 photoinitiator and cured under a high intensity UV lamp at a conveyor speed of 20'/minute. Linear Shrinkage was 2.14% and Hardness was 84 D0.

Example 6

A doming resin formulation with good outdoor weathering properties was prepared as follows:

| | |
|---|---|
| Polymer in Example 5 | 100.0 |
| Irgacure 184 | 1.8 |
| Irgacure 819 | 0.1 |
| Tinuvin 1130 | 0.5 |
| Tinuvin 292 | 0.5 |
| Irganox 1010 | 0.5 |
| Polyethelene Glycol Diacrylate | 10.0 |

This was a clear, transparent liquid with a viscosity of 110,000 cps.

The coating was poured onto a round, flexible decal of 2" diameter. The coating was applied at a thickness of 0.08". The decal was passed under a high intensity UV lamp at a conveyor speed of 20'/minute. The surface temperature of the coating was 155° C.

Adhesion was good. The cured coating had a 60° gloss of 85 and was transparent. There was substantial curling of the decal.

Example 7

Two-Component Polyurethane/UV Curable Composition

A urethane acrylate was prepared with IPDI, hydroxypropyl acrylate and a 4000 MW polyether diol in an equivalent ratio of 3/2/1. The reaction product was a clear, colorless liquid. At 25° C. the viscosity was 12,000 cps.

Part A—Polyol

This urethane acrylate was added to the polyol of a typical polyurethane doming resin formulation as seen below. In this example the urethane acrylate was simply blended with the polyol. The hydroxy acrylate monomer could also be reacted onto the isocyanate whereby the isocyanate would contain two reactive groups, isocyanate and acrylate.

| | |
|---|---|
| Polypropylene Glycol (423 MW triol) | 53.00 |
| Tinuvin P (Ultraviolet Absorber - Ciba) | 1.00 |
| Dibutyltin Dilaureate (Catalyst) | 1.00 |
| Irganox 1010 (Antioxidant - Ciba) | 1.00 |
| SF-96 (Surface Active Agent - GE Silicone) | 0.04 |
| Urethane Acrylate | 42.0 |
| Irgacure 184 | 2.0 |
| Irgacure 819 | 0.10 |
| | 100.14 |

Part B—Isocyanate

Part B of this formulation can be prepared by reacting an aliphatic diisocyanate with a polyol. The polyol can be a difunctional, trifunctional and/or tetrafunctional. This will form the isocyanate prepolymer. The dry polyol is mixed with the diisocyanate and heated to 90° C. for one hour under 29" of vacuum.

A typical formulation for the isocyanate is as follows:

| | |
|---|---:|
| Polypropylene Glycol (1000 MW diol) | 40.00 |
| Dicyclohexylmethane 4,4'-diisocyanate | 60.00 |
| | 100.00 |

The dicyclohexylmethane 4,4'-diisocyanate is available from Bayer.

Equal volumes of Part A and Part B were mixed together in a meter-mix-dispensing equipment and applied onto the surface to be domed. The domed article was then passed under a high intensity UV lamp at a conveyor speed of 20'/minute. The surface temperature of the coating was 48° C. A skin formed and the body of the dome, although not fully cured, became thick and did not flow immediately after exposure to the UV light.

The coated decal was left to cure for 24 hours at 25° C. and 50% relative humidity. Adhesion was good. The cured coating had a hardness of 80 D0 and a 60° gloss of 82. The dome was transparent. No curling of the decal was observed.

Example 8

Two-Component Epoxy/UV Curable Composition

An acrylate-epoxy oligomer can be made by acrylating an epoxy resin. For example, an epoxy resin can be acrylated in a two step reaction. In the first step, a hydroxy acrylate is reacted with an anhydride or a diacid to form an ester having a free carboxylic acid group and a free acrylate group. The reaction occurs between a carboxylic group of the diacid or anhydride, and the hydroxyl group of the hydroxy acrylate. The resulting ester is then reacted with an epoxy resin to form the acrylate-epoxy oligomer. The epoxy resin can be either aliphatic or aromatic. Bisphenol A epoxy resin based acrylates are preferable to use with bisphenol A epoxy doming resins.

There are many epoxy-acrylates commercially available that are suitable for this application. Some examples are Laromer LR 9019 (BASF), Photomer 3015 (Cognis) and CN-120 (Sartomer).

A suitable epoxy doming resin composition is prepared from the reaction of an epoxy resin with amine hardeners. To facilitate the application of the chemicals in production, the epoxy resin and amine hardeners are formulated into an easily handled two-component product. Part B, the amine hardener, is usually formulated to be used in a simple volumetric ratio with the epoxy resin. A typical formulation for Part B is as follows:

Part B—Epoxy Hardener

| | |
|---|---:|
| Polyoxypropyleneamine | 30.00 |
| Nonyl Phenol | 18.00 |
| CN-120, Epoxy Acrylate Oligomer | 50.00 |
| Irgacure 184 Photoinitiator | 2.0 |
| | 100.00 |

The above formulation is simply mixed together. Heating is not necessary. To form the epoxy doming resin, equal volumes of Part B and the epoxy resin (Part A) are mixed together and applied onto the substrate to be domed.

Part A—Epoxy Resin

| | |
|---|---:|
| Epoxy Resin | 100.00 |

A suitable epoxy resin is Epon 825 (Shell Chemicals). A suitable amine hardener is Jeffamine D-230 (Texaco Chemicals).

Equal volumes of Part A and Part B are mixed together in meter-mix-dispensing equipment and applied onto the surface to be domed. The domed article was then passed under a high intensity UV lamp at a conveyor speed of 20'/minute. The surface temperature of the coating reached 58° C. A skin formed and the body of the dome, although not fully cured, became thick and did not flow immediately after exposure to the UV light.

The coated decal was left to cure for 24 hours at 25° C. and 50% relative humidity. Adhesion was good. The cured coating had a hardness of 65 D0 and a 60° gloss of 82. The dome was transparent. No curling of the decal was observed.

Example 9

Cationic UV Curing System

| | |
|---|---:|
| UVR-6105 | 91.0 |
| UVR-6000 | 9.0 |
| UVI-6976 | 0.05 |
| | 100.05 |

UVR-6105 is a cycloaliphatic epoxy resin. UVR-6000 is an aliphatic epoxy diluent. UVI-6976 is a mixture of triaryl sulfonium hexafluoroantimonate salts. All these resins are available from Dow Chemical.

This was a clear, transparent liquid with a viscosity of 200 cps.

The coating was poured onto a round, flexible decal of 2" diameter. The coating was applied at a thickness of 0.08". The decal was passed under a high intensity UV lamp at a conveyor speed of 20'/minute. The surface temperature of the coating reached 109° C.

The dome continued to cure after exposure to the UV light. Following exposure, samples were heated for 2 hours at 60° C., to complete the cure, including the "dark cure" process.

Adhesion was good. Hardness was 80 D. The cured coating had a 60° gloss of 84 and was clear and transparent. Some curling of the flexible decal was observed.

Example 10

Cationic UV Curing System

| | |
|---|---:|
| UVR = 6105 | 45.5 |
| Bisphenol A Epoxy Resin | 45.5 |
| UVI-6976 | 0.05 |

UVR-6105 is a cycloaliphatic epoxy resin. UVI-6976 is a mixture of triaryl sulfonium hexafluoroantimonate salts. All the resins are available from Dow Chemical. The bisphenal A epoxy resin is available from Dow Chemicals under DER 331.

This was a clear, transparent liquid with a viscosity of 2000 cps.

The coating was poured onto a round, flexible decal of 2" diameter. The coating was applied at a thickness of 0.08". The decal was passed under a high intensity UV lamp at a conveyor speed of 20'/minute. The surface temperature of the coating reached 61° C.

The domes continued to cure after exposure to the UV light. Following exposure, samples were heated for 2 hours at 60° C., to complete the cure, including the "dark cure" process.

Adhesion was good. Hardness was 80 D. The cured coating had a 60° gloss of 84 and was clear and transparent. No curling of the flexible decal was observed.

Example 11

Cationic UV Curing System

| UVR-6110 | 33.11 |
| UVI-6976 | 0.67 |
| Polyurethane Polyol | 33.11 |
| Polyurethane Isocyanate | 33.11 |
| | 100.00 |

The polyurethane polyol and isocyanate formulations are given in Example 7.

UVR-6110 ia a cycloaliphatic epoxy resins. UVI-6976 is a mixture of triaryl sulfonium hexafluoroantimonate salts. These resins are available from Dow Chemical.

This is a clear, transparent liquid with a viscosity of 800 cps.

The coating was poured onto a round, flexible decal of 2" diameter. The coating was applied at a thickness of 0.08". The decal was passed under a high intensity UV lamp at a conveyor speed of 20'/minute. The surface temperature of the coating reached 55° C.

The domes continued to cure after exposure to the UV light. Following exposure, samples were heated for 2 hours at 60° C., to complete the cure, including the "dark cure" process.

Adhesion was good. Hardness was 80 D0. The cured coating had a 60° gloss of 87 and was clear and transparent. No curling of the flexible decal was observed.

Example 12

Silylated Polyurethane/Urethane Acrylate

| Silylated Polyurethane Resin | 80.00 |
| Urethane Acrylate Oligomer from Example 1 | 20.00 |
| Irgacure 184 Photoinitiator | 2.00 |

The coating was poured onto a round, flexible decal of 3" diameter. The coating was applied at a thickness of 0.08". The decal was passed under a high intensity UV lamp at a conveyor speed of 20'/minute. The surface temperature of the coating was 55° C.

A skin formed and the body of the dome, although not fully cured, became thick and did not flow immediately after exposure to the UV light.

The coated decal was left to cure for 24 hours at 25° C. and 50% relative humidity. Adhesion was good. The cured coating had a hardness of 45 D0 and a 60° gloss of 80. The dome was transparent. No curling of the decal was observed.

Example 13

Silylated Polyurethane/Acrylated Monomer

| Silylated Polyurethane Resin | 80.00 |
| Tetrahydrofurfuryl Acrylate | 20.00 |
| Irgacure 184 Photoinitiator | 2.0 |

The coating was poured onto a round, flexible decal of 3" diameter. The coating was applied at a thickness of 0.08". The decal was passed under a high intensity UV lamp at a conveyor speed of 20'/minute. The surface temperature of the coating was 55° C. A skin formed and the body of the dome, although not fully cured, became thick and did not flow immediately after exposure to the UV light.

The coated decal was left to cure for 24 hours at 25° C. and 50% relative humidity. Adhesion was good. The cured coating had a hardness of 55 D0 and a 60° gloss of 82. The dome was transparent. No curling of the decal was observed.

Example 14

A silylated polyurethane doming resin, as described in co-pending application Ser. No. 11/124,077, had a Shore D0 hardness of 40 when cured at 25° C. and 50% R.H. for 24 hours.

A urethane acrylate was prepared with IPDI and hydroxyethyl acrylate an equivalent ratio of 1/1. The reaction product was a clear, colorless liquid. At 25° C. the viscosity was 400,000 cps. This radiation cured polymer had a hardness of 90 D.

The two polymers were mixed according to the following formulation:

| Silylated Polyurethane Resin | 90.00 |
| Urethane Acrylate Oligomer | 10.00 |
| Irgacure 184 Photoinitiator | 2.0 |

The coating was poured onto a round, flexible decal of 3" diameter. The coating was applied at a thickness of 0.08". The decal was passed under a high intensity UV lamp at a conveyor speed of 20'/minute. The surface temperature of the coating was 57° C.

A skin formed and the body of the dome, although not fully cured, became thick and did not flow immediately after exposure to the UV light.

The coated decal was left to cure for 24 hours at 25° C. and 50% relative humidity. Adhesion was good. The cured coating had a hardness of 70 D0 and a 60° gloss of 83. The dome was transparent. No curling of the decal was observed.

TABLE 1

| Sample name | Viscosity (cps at 25° C.) | Peak Exotherm Temp (° C.) | Hardness (shore) | Shrinkage (%) Linear | Density |
|---|---|---|---|---|---|
| UV-curable | 79 | 19,000 | 85 | 63 DO | 0.50 | 4.09 |
| | 87 | 18,000 | 94 | 90 DO | 0.64 | |
| | 55 | 54,000 | 104 | 90 DO | 1.12 | 4.40 |
| | 29 | 13,600 | 104 | 82 DO | 1.86 | |
| | 54 | 166,000 | 146 | 84 DO | 2.14 | |
| UV cationic-curable | 177 | 200 | 75 | 80 D | 0 | 4.78 |
| 2 component polyurethane | 808 | 1,000 | 26 | 70 DO | 0 | 5.06 |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An article comprising a substrate and a clear, colorless, transparent cured coating; wherein the coating is prepared from a composition comprising an actinic-radiation curing polymer and an ultraviolet radiation stabilizer, wherein the composition is cured with actinic radiation at a temperature of at most 150° C. to form the cured coating; wherein the cured coating has a thickness of at least about 0.5 mm and a hardness of about Shore A 90 to about Shore D 90; wherein the composition further comprises at least one photoinitiator selected from the group consisting of alpha-amino ketone; bis(2,4,6-trimethylbenzoyl)-phenylphosphine oxide; bis-(2,6-dimethoxybenzoyl)-(2,4,4-trimethylpentyl)phosphine oxide; benzyldimethyl-ketal; 1-hydroxy-cyclohexylphenyl-ketone; 2-hydroxy-2-methyl-1-phenyl-1-propanone; 50:50 blend of 2-hydroxy-2-methyl-1-phenylpropan-1-one and 2,4,6-trimethylbenzoyldiphenylphosphine oxide, and 25:75 blend of bis(2,6-dimethoxybenzoyl)-2,4,4-trimethyl phenylphosphine oxide and 2-hydroxy-2-methyl-1-phenyl-propan-1-one.

2. The article of claim 1 wherein the actinic-radiation curing polymer is an acrylate polymer or a mixture of acrylate polymers.

3. The article of claim 2 wherein the acrylate polymer is selected from the group consisting of epoxy acrylates, urethane acrylates, polyester acrylates, polyether acrylates, amine-modified polyether acrylates, acrylic acrylates, and mixtures thereof.

4. The article of claim 2 wherein the acrylate polymer is a urethane acrylate.

5. The article of claim 1 wherein the actinic-radiation curing polymer is a UV cationic curing polymer.

6. The article of claim 1 wherein the UV cationic curing polymer is selected from the group consisting of cycloaliphatic epoxy resins, caprolactone polyols, diglycidal ether of bisphenol A, monoepoxides and vinyl ethers.

7. The article of claim 1 wherein the composition has a viscosity of 50 to 20,000 cps.

8. The article of claim 1 wherein the composition further comprises a two-component epoxy or polyurethane polymer.

9. The article of claim 8 wherein the composition further comprises an aliphatic isocyanate polyurethane.

10. The article of claim 1 wherein the composition further comprises a moisture-curable silylated resin composition.

11. The article of claim 1 wherein the composition further comprises at least one selected from the group consisting of flow agents, viscosity modifiers, foam control agents, plasticizing agents, moisture scavengers, adhesion promoters, temperature stabilizers, and colorizing additives.

12. The article of claim 1 comprising a substrate having a coating in the form of scripting, letters, or other shapes.

13. The article of claim 1 wherein the UV radiation stabilizer is selected from the group consisting of hydroxyphenyl-s-triazines, hydroxyphenyl-benzotriazoles, hydroxyl-benzophenones, and oxalic anilides.

14. The article of claim 1 wherein the linear shrinkage during cure is less than 2%.

15. A clear, colorless, transparent molded article prepared from a composition comprising an actinic-radiation curing polymer and a ultraviolet radiation stabilizer, wherein the composition is cured with actinic radiation while maintaining a temperature of at most 150° C. to form the cured molded article; wherein the molded article has a thickness of at least about 0.5 mm and a hardness of about Shore A 90 to about Shore D 90; wherein the composition further comprises at least one photoinitiator selected from the group consisting of alpha-amino ketone; bis(2,4,6-trimethylbenzoyl)-phenylphosphine oxide; bis-(2,6-dimethoxybenzoyl)-(2,4,4-trimethylpentyl)phosphine oxide; benzyldimethyl-ketal; 1-hydroxy-cyclohexylphenyl-ketone; 2-hydroxy-2-methyl-1-phenyl-1-propanone; 50:50 blend of 2-hydroxy-2-methyl-1-phenylpropan-1-one and 2,4,6-trimethylbenzoyldiphenylphosphine oxide, and 25:75 blend of bis(2,6-dimethoxybenzoyl)-2,4,4-trimethyl phenylphosphine oxide and 2-hydroxy-2-methyl-1-phenyl-propan-1-one.

16. The article of claim 15 wherein the UV radiation stabilizer is selected from the group consisting of hydroxyphenyl-s-triazines, hydroxyphenyl-benzotriazoles, hydroxyl-benzophenones, and oxalic anilides.

17. The article of claim 15 wherein the linear shrinkage during cure is less than 2%.

18. An article comprising a substrate and a clear, colorless, transparent cured coating; wherein the coating is prepared from a composition comprising an actinic-radiation curing polymer and a two-component epoxy or polyurethane polymer, wherein the composition is cured with actinic radiation at a temperature of at most 150° C. to form the cured coating; wherein the cured coating has a thickness of at least about 0.5 mm and a hardness of about Shore A 90 to about Shore D 90; wherein the composition further comprises a photoinitiator selected from the group consisting of bis(2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide.

19. The article of claim 18 wherein the composition further comprises a UV radiation stabilizer.

20. The article of claim 19 wherein the UV radiation stabilizer is selected from the group consisting of hydroxyphenyl-s-triazines, hydroxyphenyl-benzotriazoles, hydroxyl-benzophenones, and oxalic anilides.

21. The article of claim 18 wherein the linear shrinkage during cure is less than 2%.

22. A clear, colorless, transparent molded article prepared from a composition comprising an actinic-radiation curing polymer and a two-component epoxy or polyurethane polymer, wherein the composition is cured with actinic radiation at a temperature of at most 150° C. to form the cured coating; wherein the cured coating has a thickness of at least about 0.5 mm and a hardness of about Shore A 90 to about Shore D 90; wherein the composition further comprises a photoinitiator selected from the group consisting of bis(2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide.

23. The article of claim 22 wherein the linear shrinkage during cure is less than 2%.

* * * * *